United States Patent
Akimoto et al.

(10) Patent No.: US 9,154,276 B2
(45) Date of Patent: Oct. 6, 2015

(54) WIRELESS COMMUNICATION SYSTEM, MOBILE STATION APPARATUS, AND BASE STATION APPARATUS USING DEMODULATION REFERENCE SIGNAL

(75) Inventors: Yosuke Akimoto, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 98 days.

(21) Appl. No.: 14/111,484

(22) PCT Filed: Apr. 4, 2012

(86) PCT No.: PCT/JP2012/059221
§ 371 (c)(1),
(2), (4) Date: Oct. 11, 2013

(87) PCT Pub. No.: WO2012/141054
PCT Pub. Date: Oct. 18, 2012

(65) Prior Publication Data
US 2014/0036850 A1 Feb. 6, 2014

(30) Foreign Application Priority Data
Apr. 13, 2011 (JP) .................................. 2011-088961

(51) Int. Cl.
*H04W 4/00* (2009.01)
*H04L 5/00* (2006.01)
*H04L 27/26* (2006.01)
*H04J 13/00* (2011.01)
*H04L 25/03* (2006.01)
*H04B 7/04* (2006.01)

(52) U.S. Cl.
CPC ............. *H04L 5/0017* (2013.01); *H04J 13/004* (2013.01); *H04J 13/0062* (2013.01); *H04L 5/0026* (2013.01); *H04L 5/0051* (2013.01); *H04L 27/2613* (2013.01); *H04B 7/0413* (2013.01); *H04L 5/0023* (2013.01); *H04L 5/0053* (2013.01); *H04L 27/2636* (2013.01); *H04L 2025/03414* (2013.01)

(58) Field of Classification Search
CPC ..................................................... H04L 5/0017
See application file for complete search history.

(56) References Cited

FOREIGN PATENT DOCUMENTS

EP 2056515 A1 * 5/2009

OTHER PUBLICATIONS

R1-091772, Nokia Siemens Networks, Nokia, "Reference Signal structure for LTE-Advanced UL SU-MIMO", 3GPP TSG RAN WG1 Meeting #57, 15.5, San Francisco, USA, May 4-8, 2009.
R1-092801, NTT DOCOMO, "UL RS Enhancement for LTE-Advanced", 3GPP TSG RAN WG1 Meeting #57bis, 15.2, Los Angeles, USA, Jun. 29-Jul. 3, 2009, pp. 1-5.

* cited by examiner

*Primary Examiner* — Maharishi Khirodhar
(74) *Attorney, Agent, or Firm* — Birch, Stewart, Kolasch & Birch, LLP

(57) ABSTRACT

Regarding an uplink demodulation reference signal to which a cyclic shift and an orthogonal cover code is applied, IFDM is applied to the uplink demodulation reference signal while retaining the number of bits of control information that specifies a cyclic shift and an orthogonal cover code transmitted from a base station apparatus to a mobile station apparatus. A subcarrier offset and a subcarrier interval based on IFDM are uniquely determined in accordance with the cyclic shift and the orthogonal cover code of the uplink demodulation reference signal, reported from the base station apparatus to the mobile station apparatus.

12 Claims, 8 Drawing Sheets

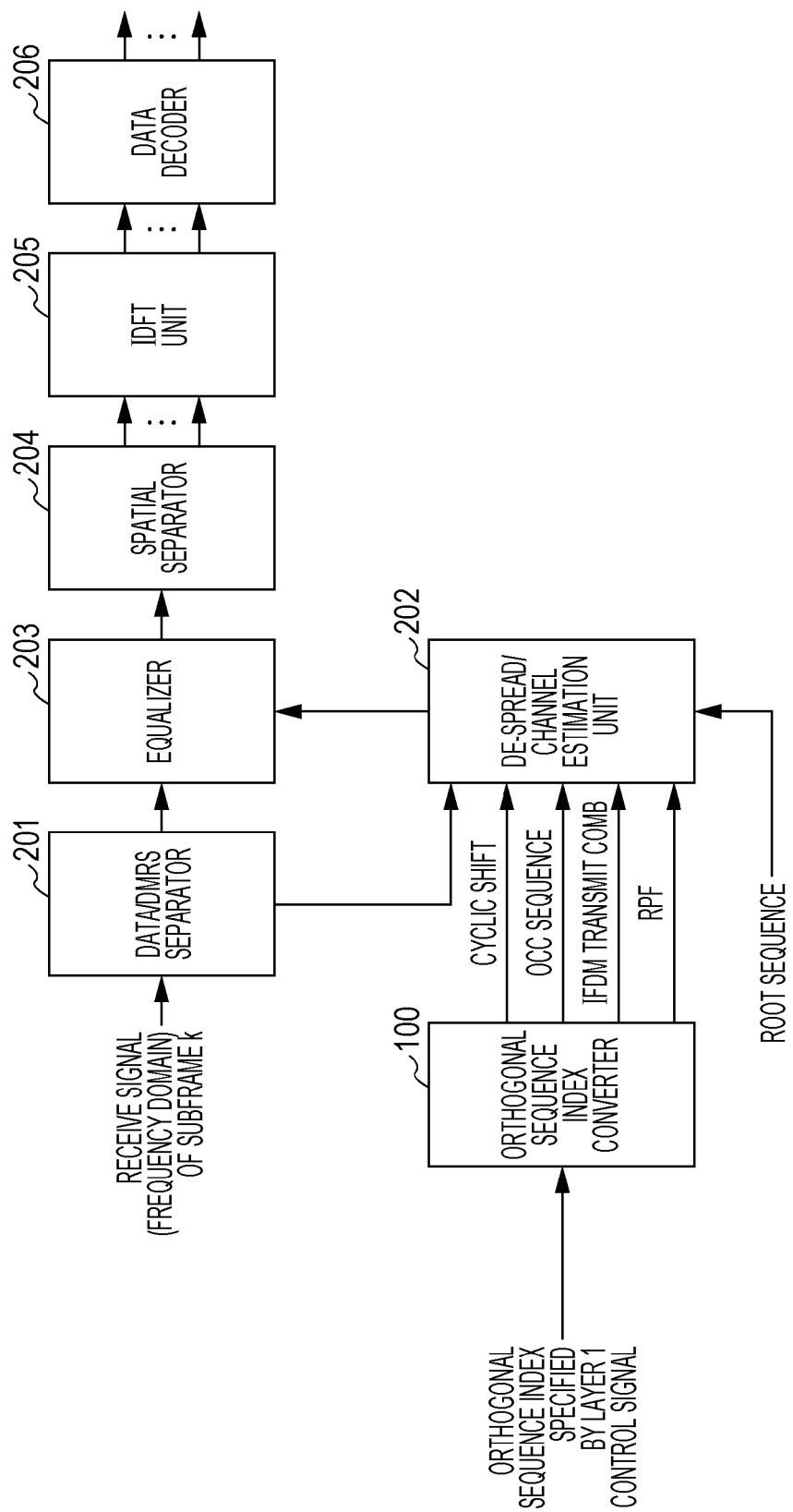

FIG. 3

| ORTHOGONAL SEQUENCE INDEX M | CYCLIC SHIFT INDEX | | | | ORTHOGONAL COVER CODE (OCC) | | | | RPF | IFDM TRANSMIT COMB INDEX | | | |
|---|---|---|---|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | | $\lambda=0$ | $\lambda=1$ | $\lambda=2$ | $\lambda=3$ |
| 0 | 0 | 6 | 9 | 3 | [+1 +1] | [+1 +1] | [+1 −1] | [+1 −1] | 1 | N/A | N/A | N/A | N/A |
| 1 | 6 | 0 | 3 | 9 | [+1 −1] | [+1 −1] | [+1 +1] | [+1 +1] | 1 | N/A | N/A | N/A | N/A |
| 2 | 3 | 9 | 6 | 0 | [+1 −1] | [+1 +1] | [+1 +1] | [+1 −1] | 2 | n | n+1 | n | n+1 |
| 3 | 4 | 10 | 7 | 1 | [+1 +1] | [+1 −1] | [+1 +1] | [+1 −1] | 4 | n | n+1 | n+2 | n+3 |
| 4 | 2 | 8 | 5 | 11 | [+1 +1] | [+1 +1] | [+1 −1] | [+1 +1] | 4 | n+3 | n+2 | n+1 | n |
| 5 | 8 | 2 | 11 | 5 | [+1 −1] | [+1 +1] | [+1 −1] | [+1 +1] | 4 | n+2 | n+3 | n | n+1 |
| 6 | 10 | 4 | 1 | 7 | [+1 −1] | [+1 −1] | [+1 −1] | [+1 −1] | 4 | n+1 | n | n+3 | n+2 |
| 7 | 9 | 3 | 0 | 6 | [+1 +1] | [+1 +1] | [+1 −1] | [+1 −1] | 2 | n+1 | n | n+1 | n |

FIG. 7

| ORTHOGONAL SEQUENCE INDEX M | CYCLIC SHIFT INDEX $\lambda=0$ | ORTHOGONAL COVER CODE (OCC) $\lambda=0$ |
|---|---|---|
| 0 | 0 | [+1 +1] |
| 1 | 6 | [+1 +1] |
| 2 | 3 | [+1 +1] |
| 3 | 4 | [+1 +1] |
| 4 | 2 | [+1 +1] |
| 5 | 8 | [+1 +1] |
| 6 | 10 | [+1 +1] |
| 7 | 9 | [+1 +1] |

FIG. 8

| ORTHOGONAL SEQUENCE INDEX M | CYCLIC SHIFT INDEX | | | | ORTHOGONAL COVER CODE (OCC) | | | |
|---|---|---|---|---|---|---|---|---|
| | λ=0 | λ=1 | λ=2 | λ=3 | λ=0 | λ=1 | λ=2 | λ=3 |
| 0 | 0 | 6 | 9 | 3 | [+1 +1] | [+1 +1] | [+1 -1] | [+1 -1] |
| 1 | 6 | 0 | 3 | 9 | [+1 -1] | [+1 -1] | [+1 +1] | [+1 +1] |
| 2 | 3 | 9 | 6 | 0 | [+1 -1] | [+1 -1] | [+1 +1] | [+1 +1] |
| 3 | 4 | 10 | 7 | 1 | [+1 +1] | [+1 +1] | [+1 +1] | [+1 +1] |
| 4 | 2 | 8 | 5 | 11 | [+1 +1] | [+1 -1] | [+1 +1] | [+1 +1] |
| 5 | 8 | 2 | 11 | 5 | [+1 -1] | [+1 -1] | [+1 -1] | [+1 -1] |
| 6 | 10 | 4 | 1 | 7 | [+1 -1] | [+1 +1] | [+1 -1] | [+1 -1] |
| 7 | 9 | 3 | 0 | 6 | [+1 +1] | [+1 +1] | [+1 -1] | [+1 -1] |

WIRELESS COMMUNICATION SYSTEM, MOBILE STATION APPARATUS, AND BASE STATION APPARATUS USING DEMODULATION REFERENCE SIGNAL

This application is the National Phase of PCT International Application No. PCT/JP2012/059221, filed on Apr. 4, 2012, and under 35 U.S.C. 119(a) to Patent Application No. 2011-088961, filed in Japan on Apr. 13, 2011, all of which are hereby expressly incorporated by reference into the present application.

TECHNICAL FIELD

The present invention relates to communication technology, and more particularly relates to uplink demodulation reference signal multiplexing technology, transmission technology, and reception technology thereof in a mobile communication system including a base station apparatus and a mobile station apparatus that perform transmission and reception.

BACKGROUND ART

At present, 3GPP (3rd Generation Partnership Project) has been examining LTE Advanced (hereinafter referred to as "LTE-A") for a further increase in communication speed. SC-FDMA (Single Carrier Frequency Division Multiple Access) system with excellent PAPR (Peak to Average Power Ratio) characteristics is adopted in uplink in LTE. In LTE uplink, spatial multiplexing using MIMO (Multiple Input Multiple Output) can be used. In particular, MU-MIMO (Multi-User MIMO) that performs spatial multiplexing in which multiple mobile station apparatuses use the same frequency and time resource can be used.

To reduce degradation of characteristics in MIMO communication caused by noise, interference, or the like, it is desirable to highly accurately calculate the channel (may also be referred to as "propagation path") of each antenna port (defined for every physical antenna or combination of two or more physical antennas) in transmission and reception. In LTE, orthogonality in frequency domain is realized by code multiplexing implemented by allocating, to each antenna port, a sequence generated by applying a cyclic shift in time domain to an uplink demodulation reference signal (UL DMRS: Uplink Demodulation Reference Signal) generated on the basis of a Zadoff-Chu sequence. Further, since there are two sequences of UL DMRS (that is, two SC-FDMA symbols) in one subframe, LTE-A applies a Walsh sequence in units of SC-FDMA symbols, thereby realizing orthogonality in time domain (Non Patent Literature 1). This spread sequence applied in time domain is referred to as an orthogonal cover code or an OCC (Orthogonal Cover Code).

A condition in which orthogonality is established by a cyclic shift in UL DMRS is limited to the case in which the allocated frequency regions are completely the same. Therefore, when MU-MIMO is applied to mobile station apparatuses to which different frequency regions are allocated, orthogonality between the mobile station apparatuses can be realized by allocating orthogonal OCCs, such as [+1 +1] and [−1 −1], to the mobile station apparatuses, respectively. Further, as in Non Patent Literature 2, it has been proposed to use IFDM (Interleaved Frequency Domain Multiplexing) that arranges DMRS in a comb-shape on the frequency axis. Orthogonality of multiplexed UL DMRS can be realized by changing the offset of a subcarrier to be allocated.

CITATION LIST

Non Patent Literature

NPL 1: R1-091772, Nokia Siemens Networks, Nokia, "Reference Signal structure for LTE-Advanced UL SU-MIMO" 3GPP TSG RAN WG1 Meeting #57, May, 2009

NPL 2: R1-092801, NTT DOCOMO, "UL RS Enhancement for LTE-Advanced", 3GPP TSG RAN WG1 #57bis, June, 2009

SUMMARY OF INVENTION

Technical Problem

However, when IFDM is used in multiplexing of UL DMRS, orthogonality is not established with UL DMRS generated by not using IFDM, and hence, MU-MIMO with LTE or LTE-A cannot be realized. Further, a control signal in the physical layer which specifies a cyclic shift and OCC is defined with three bits in LTE and LTE-A. When IFDM is introduced, it is necessary to specify a subcarrier offset regarding arrangement, and there is a problem that the overhead of a control signal is increased.

The present invention has been made in view of the above-described circumstances, and an object of the present invention is to provide a wireless communication system, a mobile station apparatus, and a base station apparatus that realize multiplexing of UL DMRS based on IFDM without increasing the overhead of a control signal in the mobile communication system including the base station apparatus and the mobile station apparatus which perform transmission and reception.

Solution to Problem (1) In order to achieve the above-described object, the present invention has taken the following measures. That is, a wireless communication system of the present invention is a wireless communication system including a mobile station apparatus that transmits a data signal and a demodulation reference signal, and a base station apparatus that receives the data signal and the demodulation reference signal transmitted from the mobile station apparatus. The demodulation reference signal is generated by applying a cyclic shift in time domain to a root sequence and spreading the result over a plurality of SC-FDMA symbols by an orthogonal cover code, and the demodulation reference signal is contiguously arranged on subcarriers or arranged by IFDM on subcarriers at equal intervals. First control information for switching between a first transmit mode that does not apply IFDM to the demodulation reference signal and a second transmit mode that applies IFDM to the demodulation reference signal is transmitted from the base station apparatus to the mobile station apparatus. Second control information is transmitted from the base station apparatus to the mobile station apparatus, the second control information being information that specifies a sequence of the demodulation reference signal. In the case where the first transmit mode is set by the first control information, the second control information specifies a cyclic shift and an orthogonal cover code to be applied to the demodulation reference signal. In the case where the second transmit mode is set by the first control information, the second control information specifies a cyclic shift, an orthogonal cover code, and a subcarrier offset and a subcarrier interval based on IFDM, which are to be applied to the demodulation reference signal. Regardless of setting based on the first control information, the number of bits of the second control information is the same.

As described above, IFDM becomes usable in UL DMRS without increasing the bit size of control information by causing a subcarrier offset and a subcarrier interval based on IFDM to be uniquely specified from a cyclic shift and an orthogonal cover code specified in the second transmit mode.

(2) In addition, in the wireless communication system of the present invention, in the second transmit mode, setting of the demodulation reference signal specified by the second control information includes a first setting that does not use IFDM and a second setting that uses IFDM.

As described above, backward compatibility which corresponds to the case in which IFDM is unusable can be retained by defining a mode that does not use IFDM to be also usable.

(3) In addition, in the wireless communication system of the present invention, the first setting includes a setting that specifies different cyclic shifts to a plurality of demodulation reference signals corresponding to spatial multiplexing layers based on MIMO, and that specifies different orthogonal cover codes to spatial multiplexing layers with a shortest cyclic shift interval.

As described above, by including, in control information, setting applicable to spatial multiplexing layers based on MIMO without using IFDM but using an orthogonal cover code, even in the case of a great delay spread and a great channel variation in frequency domain, UL DMRS capable of reducing the delay spread and the channel variation and increasing the estimation accuracy can be used.

(4) In addition, in the wireless communication system of the present invention, the second setting includes a plurality of settings that specify different subcarrier offsets to m or fewer spatial multiplexing layers based on MIMO where m is an arrangement interval on subcarriers based on IFDM, and that have different correspondences between the spatial multiplexing layers based on MIMO and the subcarrier offsets.

As described above, the influence of inter-cell interference can be minimized by using different subcarrier offsets among spatial multiplexing layers based on MIMO. At the same time, with multiple settings specifying different subcarrier offsets for the individual layers, for example, in the case where MU-MIMO is performed, it becomes possible to specify different IFDM subcarrier offsets of UL DMRS to individual mobile station apparatuses, thereby minimizing interference of UL DMRS among the mobile station apparatuses. At the same time, orthogonality independent of whether the allocated frequency bands are the same or not or regardless of the root sequence of UL DMRS can be realized.

(5) In addition, a mobile station apparatus of the present invention is a mobile station apparatus that transmits a data signal and a demodulation reference signal to a base station apparatus. The demodulation reference signal is generated by applying a cyclic shift in time domain to a root sequence and spreading the result over a plurality of SC-FDMA symbols by an orthogonal cover code, and the demodulation reference signal is contiguously arranged on subcarriers or arranged by IFDM on subcarriers at equal intervals. The mobile station apparatus receives first control information for switching between a first transmit mode that does not apply IFDM to the demodulation reference signal and a second transmit mode that applies IFDM to the demodulation reference signal, the first control information being transmitted from the base station apparatus. The mobile station apparatus receives second control information transmitted from the base station apparatus, the second control information being information that specifies a sequence of the demodulation reference signal. In the case where the first transmit mode is set by the first control information, the second control information specifies a cyclic shift and an orthogonal cover code to be applied to the demodulation reference signal. In the case where the second transmit mode is set by the first control information, the second control information specifies a cyclic shift, an orthogonal cover code, and a subcarrier offset and a subcarrier interval based on IFDM, which are to be applied to the demodulation reference signal. Regardless of setting based on the first control information, the number of bits of the second control information is the same.

As described above, IFDM becomes usable in UL DMRS without increasing the bit size of control information by causing a subcarrier offset and a subcarrier interval based on IFDM to be uniquely specified from a cyclic shift and an orthogonal cover code specified in the second transmit mode.

(6) In addition, in the mobile station apparatus of the present invention, in the second transmit mode, setting of the demodulation reference signal specified by the second control information includes a first setting that does not use IFDM and a second setting that uses IFDM.

As described above, backward compatibility which corresponds to the case in which IFDM is unusable can be retained by defining a mode that does not use IFDM to be also usable.

(7) In addition, in the mobile station apparatus of the present invention, the first setting includes a setting that specifies different cyclic shifts to a plurality of demodulation reference signals corresponding to spatial multiplexing layers based on MIMO, and that specifies different orthogonal cover codes to spatial multiplexing layers with a shortest cyclic shift interval.

As described above, by including, in control information, setting applicable to spatial multiplexing layers based on MIMO without using IFDM but using an orthogonal cover code, even in the case of a great delay spread and a great channel variation in frequency domain, UL DMRS capable of reducing the delay spread and the channel variation and increasing the estimation accuracy can be used.

(8) In addition, in the mobile station apparatus of the present invention, the second setting includes a plurality of settings that specify different subcarrier offsets to m or fewer spatial multiplexing layers based on MIMO where m is an arrangement interval on subcarriers based on IFDM, and that have different correspondences between the spatial multiplexing layers based on MIMO and the subcarrier offsets.

As described above, the influence of inter-cell interference can be minimized by using different subcarrier offsets among spatial multiplexing layers based on MIMO. At the same time, with multiple settings specifying different subcarrier offsets for the individual layers, for example, in the case where MU-MIMO is performed, it becomes possible to specify different IFDM subcarrier offsets of UL DMRS to individual mobile station apparatuses, thereby minimizing interference of UL DMRS among the mobile station apparatuses. At the same time, orthogonality independent of whether the allocated frequency bands are the same or not or regardless of the root sequence of UL DMRS can be realized.

(9) In addition, a base station apparatus of the present invention is a base station apparatus that receives a data signal and a demodulation reference signal transmitted from a mobile station apparatus. The demodulation reference signal is generated by applying a cyclic shift in time domain to a root sequence and spreading the result over a plurality of SC-FDMA symbols by an orthogonal cover code, and the demodulation reference signal is contiguously arranged on subcarriers or arranged by IFDM on subcarriers at equal intervals. The base station apparatus transmits, to the mobile station apparatus, first control information for switching between a first transmit mode that does not apply IFDM to the demodulation reference signal and a second transmit mode that applies IFDM to the demodulation reference signal. The base station apparatus transmits, to the mobile station apparatus, second control information that is information that specifies a sequence of the demodulation reference signal. In the case where the first transmit mode is set by the first control information, the second control information specifies a cyclic shift and an orthogonal cover code to be applied to the demodulation reference signal. In the case where the second transmit mode is set by the first control information, the second control information specifies a cyclic shift, an orthogonal cover code, and a subcarrier offset and a subcarrier interval based on IFDM, which are to be applied to the demodulation reference signal. Regardless of setting based on the first control information, the number of bits of the second control information is the same.

As described above, IFDM becomes usable in UL DMRS without increasing the bit size of control information by causing a subcarrier offset and a subcarrier interval based on IFDM to be uniquely specified from a cyclic shift and an orthogonal cover code specified in the second transmit mode.

(10) In addition, in the base station apparatus of the present invention, in the second transmit mode, setting of the demodulation reference signal specified by the second control information includes a first setting that does not use IFDM and a second setting that uses IFDM.

As described above, backward compatibility which corresponds to the case in which IFDM is unusable can be retained by defining a mode that does not use IFDM to be also usable.

(11) In addition, in the base station apparatus of the present invention, the first setting includes a setting that specifies different cyclic shifts to a plurality of demodulation reference signals corresponding to spatial multiplexing layers based on MIMO, and that specifies different orthogonal cover codes to spatial multiplexing layers with a shortest cyclic shift interval.

As described above, by including, in control information, setting applicable to spatial multiplexing layers based on MIMO without using IFDM but using an orthogonal cover code, even in the case of a great delay spread and a great channel variation in frequency domain, UL DMRS capable of reducing the delay spread and the channel variation and increasing the estimation accuracy can be used.

(12) In addition, in the base station apparatus of the present invention, the second setting includes a plurality of settings that specify different subcarrier offsets to m or fewer spatial multiplexing layers based on MIMO where m is an arrangement interval on subcarriers based on IFDM, and that have different correspondences between the spatial multiplexing layers based on MIMO and the subcarrier offsets.

As described above, the influence of inter-cell interference can be minimized by using different subcarrier offsets among spatial multiplexing layers based on MIMO. At the same time, with multiple settings specifying different subcarrier offsets for the individual layers, for example, in the case where MU-MIMO is performed, it becomes possible to specify different IFDM subcarrier offsets of UL DMRS to individual mobile station apparatuses, thereby minimizing interference of UL DMRS among the mobile station apparatuses. At the same time, orthogonality independent of whether the allocated frequency bands are the same or not or regardless of the root sequence of UL DMRS can be realized.

Advantageous Effects of Invention

According to the present invention, there can be provided a wireless communication system, a mobile station apparatus, and a base station apparatus that realize multiplexing of UL DMRS based on IFDM without increasing the overhead of a control signal in the mobile communication system including the base station apparatus and the mobile station apparatus which perform transmission and reception.

BRIEF DESCRIPTION OF DRAWINGS

FIG. 2 is a functional block diagram illustrating an exemplary configuration of a receiver included in a base station apparatus of the present invention.

FIG. 3 is a diagram representing allocation of cyclic shift, OCC, and IFDM transmit comb indices in the present invention.

FIG. 7 is a diagram representing the allocation of a cyclic shift in LTE.

FIG. 8 is a diagram representing the allocation of a cyclic shift and OCC in LTE-A.

DESCRIPTION OF EMBODIMENTS

At present, 3GPP (3rd Generation Partnership Project) has been examining LTE Advanced (hereinafter referred to as "LTE-A") for a further increase in communication speed. SC-FDMA (Single Carrier Frequency Division Multiple Access) system with excellent PAPR (Peak to Average Power Ratio) characteristics is adopted in uplink in LTE. In LTE uplink, spatial multiplexing using MIMO (Multiple Input Multiple Output) can be used. SU-MIMO (Single-User MIMO) in which one mobile station apparatus performs MIMO, and MU-MIMO (Multi-User MIMO) in which signals are transmitted by multiple mobile station apparatuses by performing spatial multiplexing can be used.

To reduce degradation of the quality of MIMO communication caused by noise or interference, it is desirable to highly accurately calculate the channel (may also be referred to as "propagation path") of each antenna port (defined for every physical antenna or combination of two or more physical antennas) in transmission and reception. In LTE, an uplink demodulation reference signal (UL DMRS: Uplink Demodulation Reference Signal) is generated by applying a cyclic shift in time domain to a sequence generated on the basis of a Zadoff-Chu sequence (hereinafter referred to as a root sequence). When this is extended to SU-MIMO or MU-MIMO, orthogonality can be realized by applying different cyclic shifts to individual antenna ports or mobile station apparatuses. Further, since there are two sequences of UL DMRS (that is, two SC-FDMA symbols) in one subframe, when this sequence is mapped to each SC-FDMA symbol in LTE-A, this sequence is multiplied by a Walsh sequence [+1 +1] or [−1 −1], thereby realizing orthogonality also in time domain. This spread sequence applied in time domain is referred to as an OCC (Orthogonal Cover Code).

A condition in which orthogonality is established by a cyclic shift in UL DMRS is limited to the case in which the allocated frequency region is the same as a root sequence. Therefore, to realize MU-MIMO in mobile station apparatuses to which different frequency regions are allocated, it is necessary to realize orthogonality by using only OCC. In contrast, a condition in which complete orthogonality of OCC is established is limited to the case in which the same sequence is used in two SC-FDMA symbols. Thus, for example, when UL DMRS is generated using different root sequences for individual slots, orthogonality based on OCC is not established. Hereinafter, the case in which different root sequences are used for first UL DMRS and second UL DMRS is referred to as "sequence hopping is valid", and the same root sequence is used for first UL DMRS and second UL DMRS is referred to as "sequence hopping is invalid".

Figure 6:
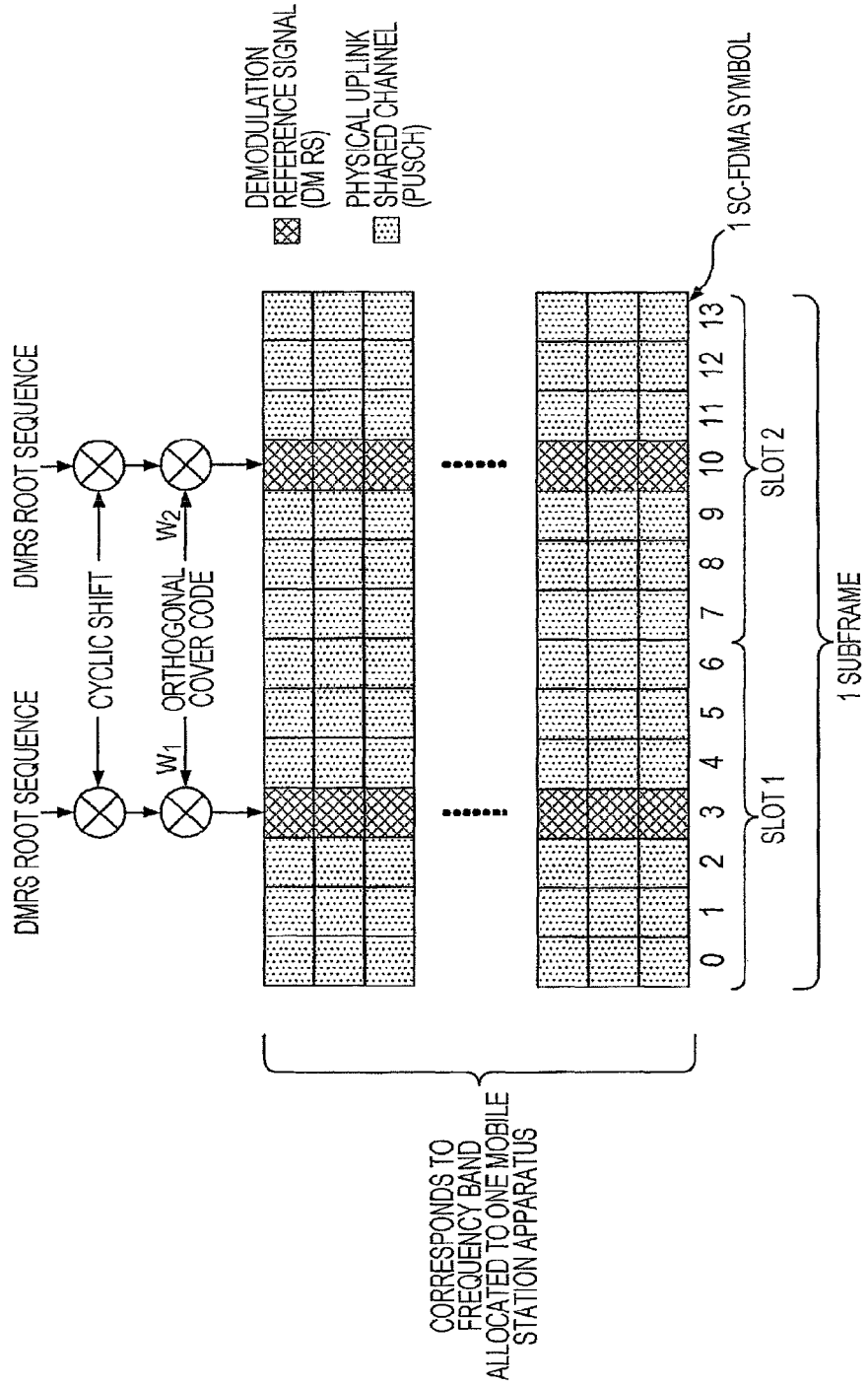
FIG. 6 is a diagram representing the arrangement of UL DMRS and the allocation of OCC in LTE and LTE-A.

FIG. 6 is a diagram illustrating the time/frequency resource configuration, that is, the subframe configuration, in LTE and LTE-A. Note that only the band of a physical uplink shared channel used in data transmission is illustrated in FIG. 6, and the frequency band of a channel for transmitting only control information (PUCCH: Physical Uplink Control Channel) is omitted. The vertical axis in FIG. 6 is the frequency axis, and one block represents a subcarrier. In LTE, twelve contiguous subcarriers are collectively regarded as a resource allocation unit, which is referred to as a resource block (RB). Meanwhile, the horizontal axis is the time axis. Frequency domain is converted to time domain, and time is divided in units of giving a cyclic prefix. This is referred to as an SC-FDMA symbol. In LTE, seven contiguous SC-FDMA symbols constitute one slot, and two slots collectively constitute one subframe. In one SC-FDMA symbol, one subcarrier is referred to as a resource element (RE). A subframe is the minimum division unit in resource allocation in time domain in LTE and LTE-A. By mainly using PDCCH (Physical Downlink Control Channel), allocation information is reported from a mobile station apparatus to a base station apparatus in each subframe.

In LTE and LTE-A, the position of an SC-FDMA symbol where UL DMRS is arranged is different in accordance with the setting of the base station apparatus. As an example, as illustrated in FIG. 6, UL DMRS is arranged in the third and tenth SC-FDMA symbols of each subframe. In LTE and LTE-A, regarding the first and second UL DMRS, in the case where sequence hopping is valid, different root sequences are used to generate the first and second UL DMRS; in the case where sequence hopping is invalid, the same root sequence is used to generate the first and second UL DMRS. After a cyclic shift based on a cyclic shift index specified by the base station apparatus is applied to this root sequence, information indicating an OCC sequence to be applied to UL DMRS, that is, which of W1=+1, W2=+1 or W1=+1, W2=−1, is used to generate UL DMRS, is reported from the base station apparatus to each mobile station apparatus. Here, W1 is a weight multiplied to the entire first UL DMRS. In the case where OCC is represented by a vector such as [+1 −1], the first element corresponds to W1, and the second element corresponds to W2. In short, W1 and W2 are multiplied to the entire sequence generated by applying a cyclic shift to the root sequence, and UL DMRS to be transmitted to the base station apparatus is generated in frequency domain. To realize orthogonality based on OCC, it is assumed that cyclic shifts applied to the first UL DMRS and second UL DMRS are completely the same, or a common offset is added to multiplexed mobile station apparatuses or antenna ports. In the case where sequence hopping is valid, orthogonality based on OCC is not established. Thus, no limitation on cyclic shifts, such as that described above, is imposed.

Since UL DMRS is used in calculating channel information used in demodulation, it is desirable to highly accurately estimate UL DMRS. In particular, in the case where SU-MIMO or MU-MIMO communication is performed, degradation of channel estimation causes significant degradation of the communication quality. It is thus desired to accurately calculate a channel for each mobile station apparatus. Therefore, UL DMRS sequences in which complete orthogonality is established are allocated to the individual mobile station apparatuses or antenna ports.

In contrast, in multiplexing of UL DMRS using cyclic shifts, no orthogonality is established unless root sequences are the same and allocated frequency regions are completely the same. Meanwhile, in multiplexing of UL DMRS using OCC, there is a problem that no orthogonality is established unless root sequences used in the first and second UL DMRS are the same.

Meanwhile, IFDM which arranges signals at a certain subcarrier interval can realize complete orthogonality by changing offsets of subcarriers where signals are arranged. Here, a signal arrangement subcarrier interval is referred to as an RPF (Repetition Factor), and a subcarrier offset value thereof is referred to as an IFDM transmit comb. Unlike multiplexing using cyclic shifts or OCC, by using IFDM, even in the case where root sequences in one SC-FDMA are not the same or allocated frequency regions are not the same, orthogonality is established if IFDM transmit combs are not the same. Further, orthogonality is established even when root sequences applied to the first and second UL DMRS are not the same. Further, because the maximum number of codes that can be realized by OCC is the number of symbols of UL-DMRS, with OCC, double multiplexing at maximum is the upper limit in MU-MIMO among mobile station apparatuses to which different frequency regions are allocated. In the case of IFDM, triple multiplexing or more is made possible by increasing RPF. As a further use of IFDM, when different IFDM transmit combs are allocated to adjacent cells, there is an advantage that interference of UL DMRS can be lessened, and a throughput gain in Coordinated Multipoint (CoMP) communication between base stations can be maximized. However, there is also a problem that no orthogonality is established with UL DMRS of LTE or LTE-A which does not use IFDM, that is, a signal where RPF=1.

Hereinafter, an LTE-compliant mobile station apparatus means a mobile station apparatus that transmits UL DMRS in which only a cyclic shift can be specified, OCC is always [+1 −1], RPF=1, and the number of transmit layers based on SU-MIMO is one. An LTE-A-compliant mobile station apparatus means a mobile station apparatus that transmits UL DMRS in which, although a cyclic shift and OCC [+1 +1] or [+1 −1] can be specified, RPF is always 1.

As has been described above, multiplexing based on cyclic shifts, OCC, and IFDM has advantages of their own. To utilize all of them, it is necessary to report all of information regarding a cyclic shift, OCC, RPF, and IFDM transmit comb from the base station apparatus to each mobile station apparatus, and the overhead of control information caused thereby becomes a problem. In particular, in LTE and LTE-A, as illustrated in FIG. 7 and FIG. 8, respectively, 3-bit control information is used in reporting a cyclic shift and OCC in the physical layer (referred to as layer 1). It is desirable to introduce IFDM without increasing this 3-bit control information. In the present invention, 3-bit layer 1 control information is configured to realize the following: (1) MU-MIMO with LTE or LTE-A mobile station apparatuses; (2) MU-MIMO independent of whether allocated frequency regions are the same or not; (3) orthogonality independent of whether sequence hopping is valid or invalid; and (4) reduction of interference of UL DMRS between cells. Hereinafter, an embodiment of the present invention will be described with reference to the drawings.

Figure 5:
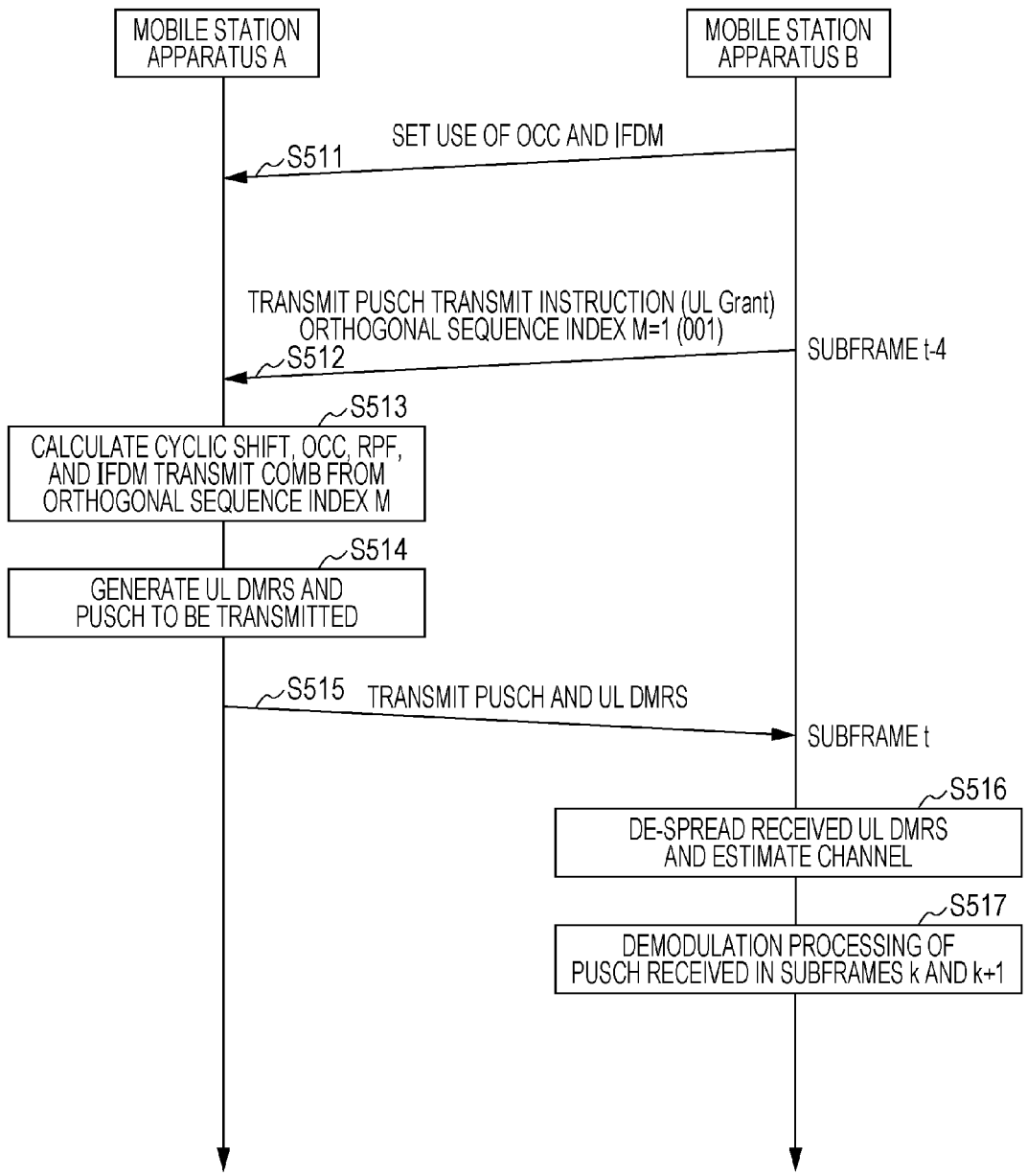
FIG. 5 is a sequence chart representing the allocation of a PUSCH resource, cyclic shift, OCC, RPF, and IFDM transmit comb index in the present invention.

A mobile communication system according to a first embodiment of the present invention has a mobile station apparatus A and a base station apparatus B. In the sequence chart in FIG. 5 illustrating the operation in the present embodiment described later, to make it simple, a procedure for one mobile station apparatus is illustrated. However, its generality is retained even in the case where this is extended to MU-MIMO using two or more mobile station apparatuses.

Figure 1:
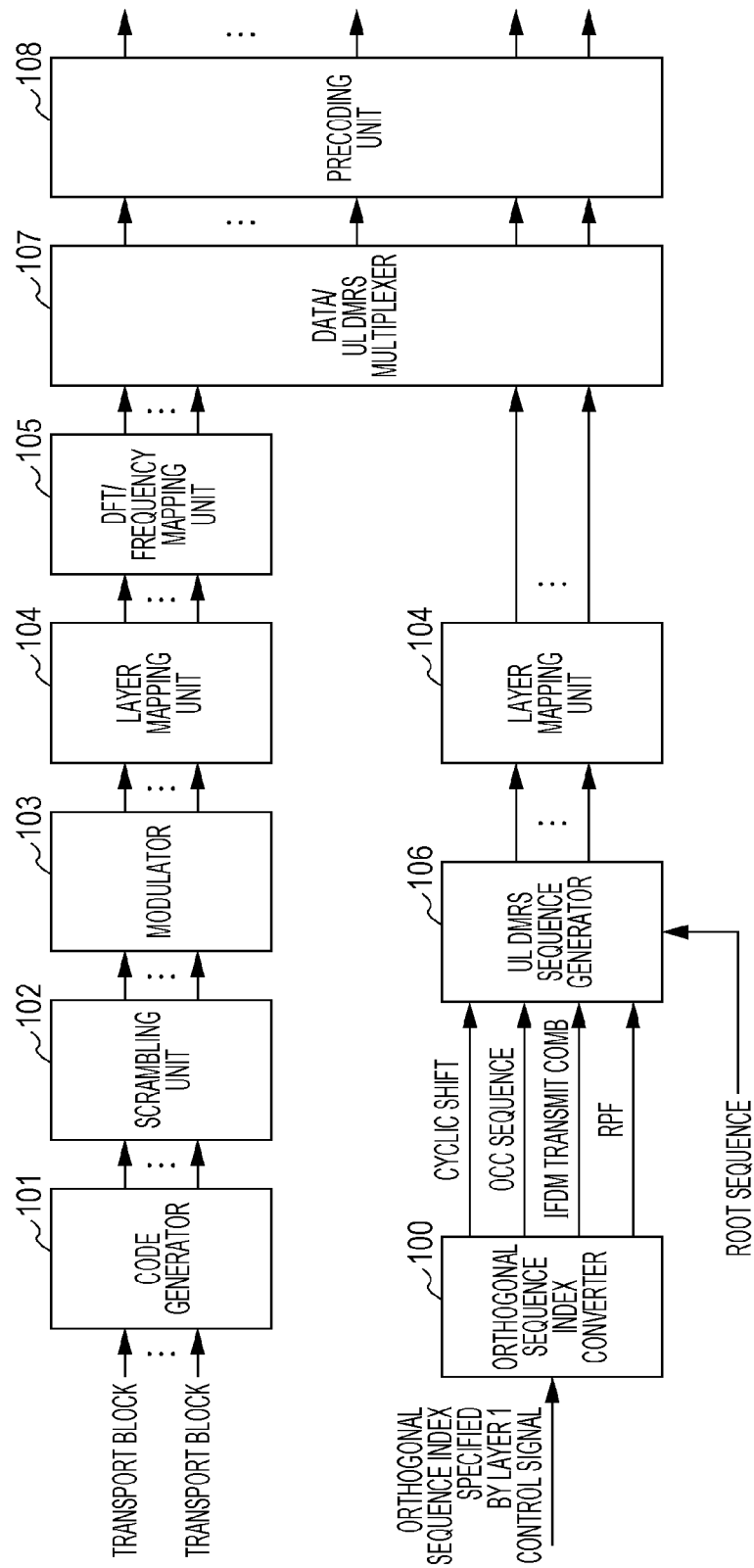
FIG. 1 is a functional block diagram illustrating an exemplary configuration of a transmitter included in a mobile station apparatus of the present invention.

FIG. 1 is a functional block diagram illustrating an exemplary configuration of a transmitter in the mobile station apparatus A of the present invention. The mobile station apparatus A of the present invention includes an orthogonal sequence index converter 100, a code generator 101, a scrambling unit 102, a modulator 103, a layer mapping unit 104, a DFT/frequency mapping unit 105, a UL DMRS sequence generator 106, a data/UL DMRS multiplexing unit 107, and a precoding unit 108. FIG. 2 is a functional block diagram illustrating an exemplary configuration of a receiver in the base station apparatus B of the present invention. The base station apparatus B of the present invention includes an orthogonal sequence index converter 100, a de-spread/channel estimation unit 202, a data/DMRS separator 201, an equalizer 203, a spatial separator 204, an IDFT unit 205, and a data decoder 206.

In accordance with control information transmitted from the base station apparatus B, the mobile station apparatus A generates multiple transport blocks. A transport block is a bit sequence transferred from a higher layer and is data corresponding to a channel called UL-SCH (Uplink Shared Channel) in the MAC layer. Further, a transport block corresponds to a processing unit of HARQ (Hybrid Automatic Repeat Request) and is determined by the number of spatial multiplexing layers based on SU-MIMO. Each transport block is input to the code generator 101, divided into coding units called code blocks, and processing is performed such as addition of CRC (Cyclic Redundancy Check), channel coding using turbo codes, bit skipping or iteration processing according to resources (rate matching), and concatenation of generated bits to all the code blocks.

The output of the code generator 101 is input to the scrambling unit 102, and scrambling is applied to each transport block in accordance with the base station apparatus at a transmission destination and the transmitting base station apparatus.

An output bit sequence of the scrambling unit 102 is input to the modulator 103 and converted to a modulated symbol of QPSK, 16QAM, 64QAM, or the like.

The output modulated symbol of the modulator 103 is input to the layer mapping unit 104, and data of the individual transport blocks is mapped to respective layers. Here, a layer matches the number of spatial multiplexing in the case where SU-MIMO is applied. Specifically, in the case where the number of transport blocks is smaller than the number of layers, serial-parallel conversion is applied to each transport block, and the converted data is mapped to multiple layers.

Each layer signal output from the layer mapping unit 104 is input to the DFT/frequency mapping unit 105. The DFT/frequency mapping unit 105 converts the input signal to a signal in frequency domain by performing DFT, maps this to a frequency resource allocated to the mobile station apparatus, and outputs the signal.

Next, generation of UL DMRS transmitted together with transport blocks will be described. A control signal specifying transmission of data received by the mobile station apparatus A (hereinafter this is referred to as UL Grant) includes information that specifies a cyclic shift, an OCC sequence, an IFDM transmit comb, and RPF applied to UL DMRS transmitted together with transport blocks. This is referred to as an orthogonal sequence index specified by the layer 1 control signal, or an orthogonal sequence index. In the present embodiment, it is assumed that the orthogonal sequence index specified by the layer 1 control signal is constituted of three bits. The orthogonal sequence index converter 100 receives, as an input, the orthogonal sequence index, manages a table indicating which cyclic shift, OCC sequence, IFDM transmit comb, and RPF this information represents, and outputs the individual pieces.

Specifically, FIG. 3 illustrates an example of a table indicating to which cyclic shift, OCC sequence, IFDM transmit comb, and RPF the orthogonal sequence index corresponds, that is, a table managed by the orthogonal sequence index converter 100. Note that which of tables illustrated in FIG. 7, FIG. 8 (first transmit mode), and FIG. 3 (second transmit mode) is to be used is set by first control information reported from the base station apparatus B to the mobile station apparatus A. In the following description, it is assumed that the setting is made to use the table in FIG. 3. This table specifies, when second control information (orthogonal sequence index M) is given, a cyclic shift, OCC, an IFDM transmit comb, and RPF of each spatial multiplexing layer $\lambda$. Note that, in this table, it is supposed that the cyclic shift is defined by an equation of $\exp(j2\pi kx/12)$ in frequency domain, where x is an index that specifies a subcarrier, and k is the value of a cyclic shift obtained from the cyclic shift index indicated in FIG. 3, which is determined by, for example, adding a certain offset value to the value of the cyclic shift index.

Firstly, the first orthogonal sequence index M=0 represents RPF=1, that is, IFDM is not to be used. Thus, nothing is specified for an IFDM transmit comb index. A cyclic shift is set so that the minimum phase difference in a layer in each transmission rank (rank is the number of layers to be spatially multiplexed) becomes maximum, and here, 0, 6, 9, and 3 are allocated to the individual layers. OCC sets [+1 +1] to $\lambda$=0 and $\lambda$=1, and sets [+1 −1] to $\lambda$=2 and $\lambda$=3. In short, the index M=0 can transmit UL DMRS in a system compatible with LTE in which neither OCC nor IFDM is used for rank 1 transmission.

Also, when more signals are multiplexed by cyclic shifts, as in a higher rank (transmission rank is 3 or 4), the case in which orthogonality is insufficient occurs in the case where the delay spread of channel is great. When both IFDM (RPF>=2) and cyclic shifts are used, the influence of the delay spread becomes great. In such a case, it is preferable to set RPF=1, and allocate different OCCs to layers to which adjacent cyclic shifts are allocated. The setting of M=0 (000) is applicable to SU-MIMO in such a case, and the setting of UL DMRS which minimizes the influence of the delay spread of channel becomes usable. Note that, in the case of the orthogonal sequence index M=1, a sequence in which OCCs are inverted from those of M=0 is allocated. For example, to perform MU-MIMO among mobile station apparatuses whose transmission ranks are 1, this sequence can be used in realizing orthogonality using OCC, thereby improving the flexibility of scheduling. So far, the orthogonal sequence indices M=0 and M=1 which do not use IFDM are referred to as a first setting.

Figure 4:
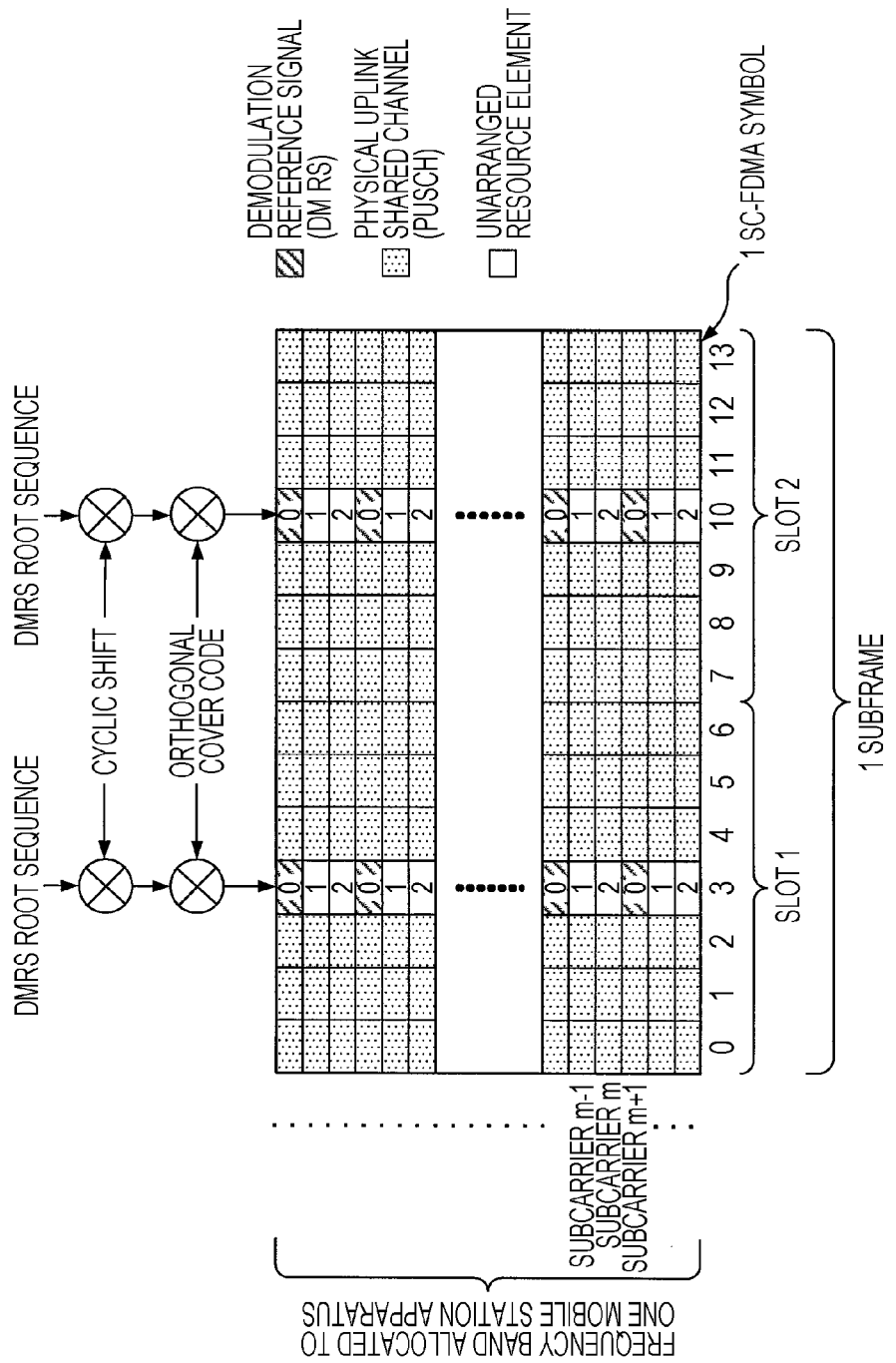
FIG. 4 is a diagram representing the arrangement of UL DMRS in the present invention.

Next, the operation in the case of orthogonal sequence indices M=2 and M=7, which are the setting of using IFDM (second setting), will be described. In this case, RPF=2 is specified, and it is specified to perform transmission using IFDM. Here, the value of RPF is aimed to prevent degradation of channel estimation accuracy caused by the delay spread of channel, while utilizing advantages of multiplexing based on IFDM. By performing switching to RPF=4 described later, it is aimed to perform an appropriate setting that takes into consideration the number of multiplexing of IFDM and the channel estimation accuracy. The IFDM transmit comb index specified by M=2 and M=7 is n or n+1, where n is a value set by a higher layer signal. For example, n can be determined for each sector of the base station apparatus. Since it is only necessary to statically set the value of n, n is unnecessary to be given as the layer 1 control signal, and hence, the overhead in layer 1 can be reduced. Alternatively, n may be fixed as, for example, 0. The IFDM transmit comb index is converted, by applying processing such as n mod 2 or the like, into an IFDM transmit comb to be actually applied, and is discretely arranged in a subcarrier (0, 1, or 2) indicated by a numeral in the third and tenth SC-FDMA symbols in FIG. 4. In the indices M=2 and M=7, different OCC [+1 +1] and [+1 −1] are allocated to spatial multiplexing layers of MIMO of their own. This is aimed to enable selection of both [+1 +1] and [+1 −1] in order to realize UL DMRS orthogonality by OCC even when allocated frequency bands are different upon performing MU-MIMO with an LTE- or LTE-A-complaint mobile station apparatus, that is, a signal where RPF=1.

Next, the operation in the case of orthogonal sequence indices M=3, 4, 5, and 6, which are the setting of using IFDM (second setting), will be described. In this case, RPF=4 is specified, and RPF can be switched and used in order to realize an appropriate setting that takes into consideration the number of multiplexing of IFDM and the channel estimation accuracy. The IFDM transmit comb index specified by M=3, 4, 5, and 6 corresponds to n to n+3, where n is a value set by a higher layer signal. For example, n can be determined for each sector of the base station apparatus. Since it is only necessary to statically set the value of n, n is unnecessary to be given as the layer 1 control signal, and hence, the overhead in layer 1 can be reduced. Alternatively, n may be fixed as, for example, 0. The IFDM transmit comb index is converted, by applying processing such as n mod 4 or the like, into an IFDM transmit comb to be actually applied, and is discretely arranged in a subcarrier (0, 1, 2, or 3) indicated by a numeral in the third and tenth SC-FDMA symbols in FIG. 4. In all the orthogonal sequence indices M=3 to 6, the value of the IFDM transmit comb index allocated to each spatial multiplexing layer is set to be different from one orthogonal sequence index to another. This is aimed to apply, in MU-MIMO among mobile station apparatuses supporting IFDM, different IFDM transmit combs to these mobile station apparatuses and to realize UL DMRS orthogonality. Further, in the case of operation of CoMP, when different base station apparatuses use different IFDM transmit comb indices, UL DMRS orthogonality can be realized among the base station apparatuses. Further, as illustrated in FIG. 3, in the orthogonal sequence indices M=3 and 4, [+1 +1] is used as OCC regardless of a spatial multiplexing layer; and in the orthogonal sequence indices M=5 and 6, [+1 −1] is used as OCC regardless of a spatial multiplexing layer. This is aimed to realize, by OCC, orthogonality with an LTE- or LTE-A-compliant mobile station apparatus that does not support IFDM.

In the above-designed table, specification of the cyclic shift index completely matches the system of LTE-A illustrated in FIG. 8. Accordingly, it is unnecessary to individually hold the mechanism of cyclic shift allocation, and the configuration of the transmitter/receiver can be simplified.

By setting the cyclic shift, OCC, RPF, and IFDM transmit comb as described above, in the case where sequence hopping is valid in MU-MIMO with an LTE- or LTE-A-compliant mobile station apparatus, orthogonality based on the cyclic shift is established by using the orthogonal sequence index M=0. In the case where sequence hopping is invalid, orthogonality with an LTE-compliant mobile station apparatus is established regardless of the frequency region by using M=1, 2, 5, or 6 where OCC is [+1 −1], in addition to the cyclic shift. Further, for MU-MIMO with an LTE-A-compliant mobile station apparatus, it is only necessary to use the orthogonal sequence index M to have a different OCC.

The cyclic shift, OCC sequence, IFDM transmit comb, and RPF, which are the output signals of the orthogonal sequence index converter 100, are input, together with information indicating the root sequence, to the UL DMRS sequence generator 106, and UL DMRS for demodulating information of each transport block is generated.

The UL DMRS signal of each layer, generated by the UL DMRS sequence generator 106, is input to the layer mapping unit 104, arranged in a respective transmission layer of MIMO, and input to the data/UL DMRS multiplexing unit 107. An output signal of the DFT/frequency mapping unit 105, which corresponds to data, is additionally input to the data/UL DMRS multiplexing unit 107, and, as illustrated in FIG. 1, the data and UL DMRS are mapped by TDM to each SC-FDMA symbol. This output is input to the precoding unit 108, and mapped to each antenna port by multiplying the information of each layer by a precoder. The output of the precoding unit 108 is subjected to processing such as A/D conversion and upconverting, and transmitted to the base station apparatus.

Next, the operation of the receiver in the base station apparatus B illustrated in FIG. 2 will be described. In response to reception of an uplink signal transmitted from the mobile station apparatus A, the receive signal is subjected to processing such as downconverting, and thereafter, converted by FFT into a signal in frequency domain. The receive signal received in a subframe t is input to the data/DMRS separator 201 and is separated into a data signal and UL DMRS for each receive antenna. Each UL DMRS signal is input to the de-spread/channel estimation unit 202.

Meanwhile, since the base station apparatus B manages the orthogonal sequence index reported to the mobile station apparatus, the base station apparatus B can calculate a cyclic shift, OCC sequence, IFDM transmit comb, and RPF actually applied by the mobile station apparatus A to UL DRMS. The orthogonal sequence index is converted by processing of the orthogonal sequence index converter 100 into a cyclic shift, OCC sequence, IFDM transmit comb, and RPF. This operation of processing of the orthogonal sequence index converter 100 is the same as the mobile station apparatus A.

The UL DMRS receive signal, which is the output signal of the data/DMRS separator 201, the cyclic shift, OCC sequence, IFDM transmit comb, and RPF, which are the output signals of the orthogonal sequence index converter 100, and the UL DMRS root sequence information are input to the de-spread/channel estimation unit 202. Using these pieces of information, the de-spread/channel estimation unit 202 de-spreads the receive signal to separate the receive signal into a signal for each mobile station apparatus and each transmit antenna port, estimates a transmit-receive channel by performing noise filtering or the like, and outputs the channel information.

The channel information, which is the output of the de-spread/channel estimation unit 202, is input to the equalizer 203. The data signal, which is the output of the data/DMRS separator 201, is also input to the equalizer 203, and the data signal is equalized using the above-described channel information. The output of the equalizer 203 is input to the spatial separator 204, which separates this into signals transmitted from the mobile station apparatuses that are spatially multiplexed in MU-MIMO and signals that are spatially multiplexed in SU-MIMO. The output of the spatial separator 204 is input to the IDFT unit 205 and converted into a signal in time domain. This signal is input to the data decoder 206, and signal detection in units of transport blocks of each mobile station apparatus, calculation of LLR (Log-Likelihood Ratio), de-scrambling, decoding processing, and the like are performed.

Next, FIG. 5 illustrates a sequence chart representing the procedure of a process regarding setting, by the base station apparatus B to the mobile station apparatus A, the use of cyclic shifts, OCC, and IFDM in UL DMRS, actually transmitting UL DMRS, and demodulation by the receiver.

Firstly, the base station apparatus B transmits the first control information to the mobile station apparatus A, and sets, for each mobile station apparatus, whether to use OCC and IFDM (step S511). That is, when it is reported not to use both OCC and IFDM, as in an LTE-compliant mobile station apparatus, UL DMRS is generated and transmitted. At this time, the analysis of the orthogonal sequence index M reported in the UL Grant is as illustrated in FIG. 7. Further, when it is reported to use OCC but not to use IFDM, as in an LTE-A-compliant mobile station apparatus, UL DMRS is generated and transmitted. At this time, the analysis of the orthogonal sequence index M reported in the UL Grant is as illustrated in FIG. 8. In the present embodiment, it is assumed that the setting is made to use both OCC and IFDM.

After this setting is completed, the base station apparatus B transmits, to the mobile station apparatus A, a specification signal (UL Grant) that transmits PUSCH in the subframe t (step S512). The UL Grant, which is transmitted to the mobile station apparatus A, includes the allocated frequency region, that is, RB information, the second control information, that is, the orthogonal sequence index M specified by the layer 1 control signal illustrated in FIG. 3, and the like. Here, it is assumed that M=1 (001) is reported.

The mobile station apparatus A, which has received the UL Grant reported in step S512, calculates, from the orthogonal sequence index M, a cyclic shift, OCC, RPF, and IFDM transmit comb for generating UL DMRS (step S513). Since the setting has been made in processing in step S511 to use both OCC and IFDM, with reference to FIG. 3, the orthogonal sequence index M is converted into information corresponding to M=1 (001). Specifically, in the case where the UL-Grant specifies SU-MIMO in two layers, the cyclic shift index applies [3 9] to layers 0 and 1, respectively, and OCC applies [+1 −1] to layers 0 and 1, respectively. RPF is 3, and the IFDM transmit comb index applies n to each layer.

When the mobile station apparatus A determines the cyclic shifts, OCC, RPF, and IFDM transmit comb by performing the processing in step S513, the mobile station apparatus A generates a PUSCH signal and UL DMRS by using the UL Grant information (step S514), and transmits the generated PUSCH signal and UL DMRS to the base station apparatus B in the subframe t (step S515).

The base station apparatus B, which has received PUSCH and UL DMRS transmitted in step S515, performs channel estimation by using the cyclic shifts, OCC, RPF, and IFDM transmit comb used by the mobile station apparatus A (step S516). By using the channel of the mobile station apparatus A, which is calculated by the processing in step S516, the base station apparatus B demodulates PUSCH received in the subframe t (step S517).

Although the description has been given by using the SC-FDMA system as an example in the embodiment of the present invention, similar advantageous effects can be obtained by using the Clustered DFT Spread OFDM system.

Note that the UL DMRS orthogonality assuming MU-MIMO has been described in the embodiment of the present invention, even in the case of SU-MIMO or one antenna transmission, an advantageous effect of improvement of estimation accuracy, such as suppressing inter-cell interference, can be obtained in the case where channel estimation is performed using multiple subframes.

A program operating on the mobile station apparatus A and the base station apparatus B according to the present invention may be a program (program causing a computer to function) that controls a CPU (Central Processing Unit) or the like in order to realize the functions of the above-described embodiment according to the present invention. Information handled by these apparatuses is temporarily accumulated in a RAM (Random Access Memory) at the time of processing, and thereafter stored in various types of ROMs (Read Only Memory) such as a Flash ROM or an HDD (Hard Disk Drive), read by the CPU as needed, and modified/written.

Part or all of the mobile station apparatus A or the base station apparatus B in the above-described embodiment may be realized with a computer. In this case, a program for realizing the control functions may be recorded on a computer-readable recording medium, and the mobile station apparatus A or the base station apparatus B may be realized by causing a computer system to read and execute the program recorded on the recording medium. Note that the "computer system" referred to here is a computer system built into the mobile station apparatus A or the base station apparatus B, and it is assumed to include an OS and hardware such as peripheral devices.

In addition, the "computer-readable recording medium" refers to a portable medium such as a flexible disk, a magneto-optical disc, ROM, CD-ROM, or the like, or a storage device such as a hard disk built into the computer system. Further, the "computer-readable recording medium" may also encompass media that briefly or dynamically retain the program, such as a communication line in the case where the program is transmitted via a network such as the Internet or a communication channel such as a telephone line, as well as media that retain the program for a given period of time, such as a volatile memory inside the computer system acting as a server or client in the above case. Moreover, the above-described program may be for realizing part of the functions discussed earlier, and may also realize the functions discussed earlier in combination with programs already recorded in the computer system.

In addition, part or all of the mobile station apparatus A or the base station apparatus B in the above-described embodiment may also be typically realized as an LSI that is an integrated circuit. The respective function blocks of the mobile station apparatus A or the base station apparatus B may be realized as individual chips, or part or all thereof may be integrated into a single chip. Furthermore, the circuit integration methodology is not limited to LSI and may also be realized with dedicated circuits or general processors. In addition, if progress in semiconductor technology yields integrated circuit technology that may substitute for LSI, an integrated circuit according to that technology may also be used.

Although the embodiment of the invention has been described in detail with reference to the drawings, specific configurations are not limited to those described above, and various design changes and the like can be made within a scope that does not depart from the gist of the present invention.

REFERENCE SIGNS LIST 100 orthogonal sequence index converter
101 code generator
102 scrambling unit
103 modulator
104 layer mapping unit
105 DFT/frequency mapping unit
106 UL DMRS sequence generator
107 data/UL DMRS multiplexing unit
108 precoding unit
201 data/DMRS separator
202 de-spread/channel estimation unit
203 equalizer
204 spatial separator
205 IDFT unit

The invention claimed is:

1. A wireless communication system comprising:
a mobile station apparatus; and
a base station apparatus, wherein
the mobile station apparatus is configured to transmit a data signal and a demodulation reference signal, and
the base station apparatus is configured to receive the data signal and the demodulation reference signal transmitted from the mobile station apparatus,
the demodulation reference signal is generated by applying a cyclic shift in time domain to a root sequence, and
the demodulation reference signal is spread over a plurality of SC-FDMA (Single Carrier-Frequency Division Multiple Access) symbols by an orthogonal cover code, and
the demodulation reference signal is contiguously arranged on subcarriers or arranged on subcarriers by IFDM (Interleaved Frequency Division Multiplexing) at equal intervals,
first control information for switching between a first transmit mode that does not apply IFDM to the demodulation reference signal and a second transmit mode that applies IFDM to the demodulation reference signal is transmitted from the base station apparatus to the mobile station apparatus,
second control information is transmitted from the base station apparatus to the mobile station apparatus, the second control information being information that specifies a sequence of the demodulation reference signal,
in a case where the first transmit mode is set by the first control information, the second control information specifies a cyclic shift and an orthogonal cover code to be applied to the demodulation reference signal,
in a case where the second transmit mode is set by the first control information, the second control information specifies a cyclic shift, an orthogonal cover code, and a subcarrier offset and a subcarrier interval based on IFDM, which are to be applied to the demodulation reference signal, and
regardless of setting based on the first control information, a number of bits of the second control information is same.

2. The wireless communication system according to claim 1, wherein, in the second transmit mode, setting of the demodulation reference signal specified by the second control information includes a first setting that does not use IFDM and a second setting that uses IFDM.

3. The wireless communication system according to claim 2, wherein the first setting includes a setting that specifies different cyclic shifts to a plurality of demodulation reference signals corresponding to spatial multiplexing layers based on MIMO (Multiple Input Multiple Output), and that specifies different orthogonal cover codes to spatial multiplexing layers with a shortest cyclic shift interval.

4. The wireless communication system according to claim 2, wherein the second setting includes a plurality of settings that specify different subcarrier offsets to m or fewer spatial multiplexing layers based on MIMO (Multiple Input Multiple Output) where m is an arrangement interval on subcarriers based on IFDM, and that have different correspondences between the spatial multiplexing layers based on MIMO and the subcarrier offsets.

5. A mobile station apparatus comprising:
a transmitter configured to transmit a data signal and a demodulation reference signal to a base station apparatus,
a generation circuit configured to:
generate the demodulation reference signal by applying a cyclic shift in time domain to a root sequence;
spread the demodulation reference signal over a plurality of SC-FDMA (Single Carrier-Frequency Division Multiple Access) symbols by an orthogonal cover code; and
contiguously arrange the demodulation reference signal on subcarriers or arrange the demodulation reference signal on subcarriers by IFDM (Interleaved Frequency Division Multiplexing) at equal intervals, and
a receiver configured to receive:
first control information for switching between a first transmit mode that does not apply IFDM to the demodulation reference signal and a second transmit mode that applies IFDM to the demodulation reference signal, the first control information being transmitted from the base station apparatus; and
second control information transmitted from the base station apparatus, the second control information being information that specifies a sequence of the demodulation reference signal, wherein
in a case where the first transmit mode is set by the first control information, the second control information specifies a cyclic shift and an orthogonal cover code to be applied to the demodulation reference signal,
in a case where the second transmit mode is set by the first control information, the second control information specifies a cyclic shift, an orthogonal cover code, and a subcarrier offset and a subcarrier interval based on IFDM, which are to be applied to the demodulation reference signal, and
regardless of setting based on the first control information, a number of bits of the second control information is same.

6. The mobile station apparatus according to claim 5, wherein, in the second transmit mode, setting of the demodulation reference signal specified by the second control information includes a first setting that does not use IFDM and a second setting that uses IFDM.

7. The mobile station apparatus according to claim 6, wherein the first setting includes a setting that specifies different cyclic shifts to a plurality of demodulation reference signals corresponding to spatial multiplexing layers based on MIMO (Multiple Input Multiple Output), and that specifies different orthogonal cover codes to spatial multiplexing layers with a shortest cyclic shift interval.

8. The mobile station apparatus according to claim 6, wherein the second setting includes a plurality of settings that specify different subcarrier offsets to m or fewer spatial multiplexing layers based on MIMO (Multiple Input Multiple Output) where m is an arrangement interval on subcarriers based on IFDM, and that have different correspondences between the spatial multiplexing layers based on MIMO and the subcarrier offsets.

9. A base station apparatus comprising:
a receiver configured to receive a data signal and a demodulation reference signal transmitted from a mobile station apparatus,
the demodulation reference signal being generated by applying a cyclic shift in time domain to a root sequence, the demodulation reference signal being spread over a plurality of SC-FDMA (Single Carrier-Frequency Division Multiple Access) symbols by an orthogonal cover code, and the demodulation reference signal being contiguously arranged on subcarriers by IFDM (Interleaved Frequency Division Multiplexing) at equal intervals; and
a transmitter configured to transmit to the mobile station apparatus:
first control information for switching between a first transmit mode that does not apply IFDM to the demodulation reference signal and a second transmit mode that applies IFDM to the demodulation reference signal; and
second control information that is information that specifies a sequence of the demodulation reference signal, wherein
in a case where the first transmit mode is set by the first control information, the second control information specifies a cyclic shift and an orthogonal cover code to be applied to the demodulation reference signal,
in a case where the second transmit mode is set by the first control information, the second control information specifies a cyclic shift, an orthogonal cover code, and a subcarrier offset and a subcarrier interval based on IFDM, which are to be applied to the demodulation reference signal, and
regardless of setting based on the first control information, a number of bits of the second control information is same.

10. The base station apparatus according to claim 9, wherein, in the second transmit mode, setting of the demodulation reference signal specified by the second control information includes a first setting that does not use IFDM and a second setting that uses IFDM.

11. The base station apparatus according to claim 10, wherein the first setting includes a setting that specifies different cyclic shifts to a plurality of demodulation reference signals corresponding to spatial multiplexing layers based on MIMO (Multiple Input Multiple Output), and that specifies different orthogonal cover codes to spatial multiplexing layers with a shortest cyclic shift interval.

12. The base station apparatus according to claim 10, wherein the second setting includes a plurality of settings that specify different subcarrier offsets to m or fewer spatial multiplexing layers based on MIMO (Multiple Input Multiple Output) where m is an arrangement interval on subcarriers based on IFDM, and that have different correspondences between the spatial multiplexing layers based on MIMO and the subcarrier offsets.

* * * * *